US008386482B2

(12) United States Patent
Gopalakrishnan

(10) Patent No.: US 8,386,482 B2
(45) Date of Patent: Feb. 26, 2013

(54) METHOD FOR PERSONALIZING INFORMATION RETRIEVAL IN A COMMUNICATION NETWORK

(75) Inventor: Sridhar Gopalakrishnan, Bangalore (IN)

(73) Assignee: Xurmo Technologies Private Limited, Bangalore (IN)

( * ) Notice: Subject to any disclaimer, the term of this patent is extended or adjusted under 35 U.S.C. 154(b) by 165 days.

(21) Appl. No.: 12/830,362

(22) Filed: Jul. 5, 2010

(65) Prior Publication Data

US 2011/0055186 A1    Mar. 3, 2011

(51) Int. Cl.
    G06F 17/30    (2006.01)
(52) U.S. Cl. ......... 707/732; 707/758; 707/765; 707/767
(58) Field of Classification Search ............... 707/732, 707/733, 758, 765, 767, 999.01, 999.107, 707/E17.059, E17.06
    See application file for complete search history.

(56) References Cited

U.S. PATENT DOCUMENTS

| | | | | |
|---|---|---|---|---|
| 7,873,657 B2 * | 1/2011 | Roche et al. | ........... | 707/771 |
| 8,135,575 B1 * | 3/2012 | Dean | ................ | 704/7 |
| 2003/0028451 A1 * | 2/2003 | Ananian | ........... | 705/27 |
| 2004/0249801 A1 * | 12/2004 | Kapur | ................ | 707/3 |
| 2005/0216550 A1 * | 9/2005 | Paseman et al. | ........... | 709/202 |
| 2006/0004703 A1 * | 1/2006 | Spivack et al. | ........... | 707/2 |
| 2007/0043745 A1 * | 2/2007 | Rojer | ................ | 707/100 |
| 2007/0050191 A1 * | 3/2007 | Weider et al. | ........... | 704/275 |
| 2007/0136264 A1 * | 6/2007 | Tran | ................ | 707/4 |
| 2007/0203693 A1 * | 8/2007 | Estes | ................ | 704/9 |
| 2008/0255881 A1 * | 10/2008 | Bone | ................ | 705/3 |
| 2008/0307320 A1 * | 12/2008 | Payne et al. | ........... | 715/751 |
| 2009/0094233 A1 * | 4/2009 | Marvit et al. | ........... | 707/5 |
| 2009/0254543 A1 * | 10/2009 | Ber et al. | ........... | 707/5 |
| 2009/0254572 A1 * | 10/2009 | Redlich et al. | ........... | 707/10 |
| 2009/0271370 A1 * | 10/2009 | Jagadish et al. | ........... | 707/3 |
| 2010/0005087 A1 * | 1/2010 | Basco et al. | ........... | 707/5 |
| 2010/0030578 A1 * | 2/2010 | Siddique et al. | ........... | 705/3 |
| 2010/0293221 A1 * | 11/2010 | Sidman et al. | ........... | 709/203 |
| 2010/0306249 A1 * | 12/2010 | Hill et al. | ........... | 707/769 |
| 2011/0004588 A1 * | 1/2011 | Leitersdorf et al. | ........... | 707/711 |
| 2011/0055186 A1 * | 3/2011 | Gopalakrishnan | ........... | 707/706 |
| 2011/0289574 A1 * | 11/2011 | Hull et al. | ........... | 726/7 |

OTHER PUBLICATIONS

Hull et al., Querying Across Languages: A Dictionary-Based Approach to Multilingual Information Retrieval, 1996, ACM, pp. 49-53.*

* cited by examiner

*Primary Examiner* — Leslie Wong
(74) *Attorney, Agent, or Firm* — Barry Choobin; Choobin & Choobin Consulta

(57) ABSTRACT

The various embodiments herein provide a method and system for personalizing information retrieval in a communication network. The method involves receiving one or more inputs from several sources and processing the information present in the received inputs. A contextual and personalized search is performed based on the received inputs and the results are displayed in support of the information in the communication network. The system has an application server for receiving the inputs from the sources and a processor for processing the information in the received inputs. One or more virtual documents are generated based on the processed information to perform a search and the results are displayed.

32 Claims, 9 Drawing Sheets

US 8,386,482 B2

METHOD FOR PERSONALIZING INFORMATION RETRIEVAL IN A COMMUNICATION NETWORK

CROSS REFERENCE TO RELATED APPLICATION

The present application claims the benefit of 2126/CHE/2009 (Government of India Patent Office), filed on Sep. 2, 2009, whose content is incorporated by reference herein in its entirety.

BACKGROUND

1. Technical Field

The embodiment herein generally relates to search engines and search methodologies in a network. The embodiment herein more particularly relates to a method for personalizing information retrieval in a communication network.

2. Description of the Related Art

Collation of information has been made accessible with relative ease from the onset of networking communication devices. Generally, individuals use search tools provided over the internet to search for specific information. The search results include information posted for academic, commercial or other purposes. The individuals then streamline the results using various options available in the search engine according to the requirements.

Social search is a concept within the internet search community which has received a delayed attention. On a broad level, social searching involves searching for people within a group of registered users with certain relevance depending on the search criteria or keywords. Many ideas have been proposed for accomplishing the social search, but most fall short for one reason or another. One problem is that searching amongst people who are not in the immediate network is always difficult and inconclusive. Secondly, handling the context of a query becomes important especially in a social search as because accuracy depends upon connecting keywords to relevant people. To provide contextually relevant results (of likely people who can help), requires a lot of information about users. Also it demands, the ability to manage and make sense of all the information that may not conform to a pre-defined structure and understand the right parameters to select the subset of users relevant to a search query. For example: if a user is a professional painter and is searching for information regarding various patterns in painting, then the results would be enhanced by knowing that he is a professional painter. However, if the same query was asked by a novice in painting, then the response would be different. A user's age may also be an appropriate factor to be considered when searching for information, like while seeking advice in medical related problems or searching vacation destinations, but not when searching for instructions on how to install some gaming software.

Most of the known computer-implemented social search tools perform searches for people depending upon the keywords lexical match entered in the "Search Box" and display the results in the same manner as they search for documents/authored content. If a user has a sound knowledge in some subject and has not mentioned in his profile regarding his skill sets, it is very obvious that he/she will not be listed in the result set. For example: If a user is a professional painter and has interest in developing graphic software but has not mentioned that in his interest's area in his profile, then he/she may not be in the result set which is queried for finding people related to graphic software development. Thus, the search is carried on a known set of parameters which constitute data in a structured manner.

Also, once presented with a set of results, the user needs to determine the appropriate person to contact from a given set of results. People naturally find ease in contacting people they know or people who know someone directly or through some other person. Most of the existing people search tools do not provide the result set to user in a way that allows the user to easily determine the degree of separation with the listed users.

Using the known search tools, the user is also often unsure of the relevance of the people returned in the result set and the reason why they were included. People are often organized to work in groups on particular projects or in areas of expertise, or both. Thus, users are often searching for other people who are working on a particular project or who have particular skills. These groups of people can be expressed in a number of ways including common department names, common security profile groups, and common distribution lists. However, the conventional search tools do not provide the result set in a way that allows the user to easily determine the relevance of the people returned in the result set. Thus there must be a provision to allow questioner to select and define the most relevant set of users to answer his query.

The abovementioned shortcomings, disadvantages and problems are addressed herein and which will be understood by reading and studying the following specification.

SUMMARY

The primary object of the embodiment herein is to develop a system and method to enable the user to acquire desired information easily, effectively and quickly.

Another object of the embodiment herein is to develop a system involving a search engine that understands a user's query to locate the most relevant person, artifacts, archives, advertisements and derived information in the communication network. Artifacts include explicit digital content such as whitepapers, proposals, pricing documents, presentations, purchase orders and invoices, resumes, audio or video clippings, mails, playlists, blogs and the like.

Yet another object of the embodiment herein is to develop software agents which are adapted to scan the network and pull out relevant data, create association of words that constitute the Word-Web and form the network dictionary.

Yet another object of the embodiment herein is to develop a search engine and software agent to continuously search for new information and automatically absorb, analyze and conceptualize the retrieved new information.

Yet another object of the embodiment herein is to develop a Word-Web which is an association of words based on statistical analysis and semantic understanding of information in the communication network.

Yet another object of the embodiment herein is to develop user specific versions of the Word-Web that contain associations of words specific to individual users.

Yet another object of the embodiment herein is to develop a Unified Word-Web which is formed as a union of Word-Webs developed on different communication networks. The Unified Word Web is a semantic dictionary that understands words across languages and creates meaningful associations between the words.

Yet another object of the embodiment herein is to develop a search engine which does not necessarily need a semantic web ready data model for searching.

Yet another object of the embodiment herein is to develop a search engine which includes machine learning algorithms that constantly evaluate effectiveness of relationships between words, people and documents so that the accuracy of the information model does not diminish with time.

Yet another object of the embodiment herein is to develop a search engine that integrates with the existing systems to constantly profile people and documents based on their interactions and the information content present in the network.

Yet another object of the embodiment herein is to develop a search engine which creates profiles of people with the available data that mimic real-life identities of a person.

Yet another object of the embodiment herein is to develop a search engine which creates and uses a social graph of people to provide relevant and personalized results.

Yet another object of the embodiment herein is to develop a search engine which provides a flexible analytics platform that provides an analysis on the data in the communication network based on the criteria defined by the user.

Yet another object of the embodiment herein is to develop a search engine which is adapted to understand the context of information.

Yet another object of the current embodiment is to develop a search engine which allow a more complete and robust collaboration between people and artifacts.

Yet another object of the embodiment herein is to search engine which enable effective collaboration by bringing together a dynamic group of relevant people and artifacts in a network based on the context of the information.

Traditional methods in semantics include deriving context from a sentence based on the natural language structure and hierarchy that form the sentence. The new methodology proposed in the embodiment disclosed herein involves deriving context from the natural structure that emerges from the associations of information with people, artifacts and itself within a network. For example, when a statement such as "Why is gravity much weaker than the other three fundamental forces?" is analyzed, traditional semantics could yield that this is a question and involves comparison between objects of a sentence. By analyzing the same statement in relation to the network of people it is associated with would yield a more evolved context—such as understanding that gravity has something to do with physics, therefore ask a physicist. If the words in the statement are closely associated with physicist in the network, or with people above a certain designation in an enterprise network, or with documents associated with the Large Hadron Collider experiment or with other words related to energy and physics, it speaks of a much larger context behind the statement.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The various embodiments herein provide a system and method for personalizing information retrieval in a communication network. The network is any interconnected system of people like an enterprise network, a social network, a network of people connected through mobile devices, etc.

According to an embodiment described herein, the method for personalizing information retrieval in a communication network comprising steps of receiving one or more inputs from a plurality of sources, processing information present in one or more inputs received from the plurality of sources, performing a contextual and personalized search based on the inputs received and displaying one or more results in support of the information in the communication network.

According to an embodiment herein, the plurality of sources comprises an instant messenger, an electronic mail, a short message service, a browser, a voice command and incumbent information sources. The one or more inputs comprise at least one of a user interaction and prevalent information content.

According to a preferred embodiment herein, receiving one or more inputs from a plurality of sources comprises establishing a customized connection to the communication network and extracting information present in the plurality of sources. The establishing of the customized connection to the communication network comprises at least one of connecting to an authenticated network and enabling privileged access to information in the communication network and developing suitable interfaces for efficient extraction and search of information in the network.

According to another preferred embodiment, enhancing the information comprises determining association between words and determining the strength between associations of words. Here, determining association between words and the strength between associations of words is based on artificial intelligence.

According to another preferred embodiment herein, the artificial intelligence comprises statistical, mathematical as well as semantics modeling of data in the communication network to form the intelligent Word-Web. The intelligent Word-Web is an ever-growing corpus of words (across languages) connected to each other in a non-hierarchical manner wherein the Word-Web creates associations of words based on statistical analysis and semantic understanding built from at least one of a word net, one or more public specific websites, one or more domain specific websites, one or more predefined documents and user inputs. The association of words are re-modelled continuously to reflect the engine's increasing understanding of the environment.

According to yet another preferred embodiment, processing the information further comprises boosting the information present in the one or more inputs of the plurality of sources. The boosting of information herein comprises assigning weights to words in the information of the one or more inputs based on different parameters wherein the parameters includes at least one of source of information, the frequency of occurrence of words and the frequency of updation of words.

According to another preferred embodiment, the information further comprises generating virtual documents comprising words pertinent to the information present in the inputs received from the plurality of sources. The virtual documents generated are query documents and profile documents.

According to another preferred embodiment, the query document comprises the words relevant to the query post its refining, enhancing and boosting and profile documents comprises refined, enhanced and boosted words relevant to the individual people and artifacts in the communication network.

According to another preferred embodiment, performing search comprises performing an iterative comparison between the information present in the query documents with the information of the profile documents and personalizing one or more results that are to be displayed based on the profile document of a user and the social graph of the communication network.

According to another preferred embodiment, the method further comprises displaying the results based on the inputs from the plurality of sources and refining the one or more results displayed. The displaying of results comprising showcasing details of the relevant people, artifacts, archives, suitable advertisements and derived information in the network.

According to another preferred embodiment, the result refining due to user or system inputs comprises modifying the information present in the query documents, updating user profiles based on the feedback from refining results and updating the Word-Web. The result refining further comprises performing a search based on the updated query and profile documents and displaying a personalized and context relevant one or more results.

Another embodiment herein provides a system for personalizing information retrieval in a communication network. The system comprises an application server for receiving one or more inputs from a plurality of sources, a processor for performing at least one of processing an information present in the one or more inputs received from the plurality of sources, generating one or more virtual documents based on the processing of the information present in the one or more inputs, performing a search based on the virtual documents generated and a display unit for displaying one or more results based on the document generated for the information.

According to a preferred embodiment, the processor comprises a query refiner for refining the information present in the one or more inputs, a query enhancer for enhancing the information present in the one or more inputs of the plurality of sources, a query booster for boosting the information present in the one or more inputs of the plurality of sources and a query document generator for generating a virtual document based on the processing of the information.

According to another preferred embodiment, the processor further comprises a word web generator to generate an intelligent web of words from one or more inputs of the plurality of sources, a content indexer and profiler to extract information from the one or more inputs of the plurality of sources and build people and artifact profiles, a content refiner for refining the contents from the one or more inputs of the plurality of sources, a content modeler and profile document generator to assign appropriate weights and generate virtual profile documents for people and artifacts, a search engine for performing an iterative comparison between the information present in a query document with the information of the profile document, a personalized module for personalizing one or more results that to be displayed based on comparison of the results with the profile document of a user and a search result refiner to refine search results based on user inputs.

Thus the search engine of the system disclosed herein constantly learns about the network and the information assets of the network and enables contextual matching so that the most appropriate person, artifacts, archives, advertisements or derived information could be provided to answer a query. The search engine can be accessed through the desktop client, company intranet, web browser, Instant Messenger, SMS and mobile phone client. The search engine is easy to deploy and can add on to existing systems in the network.

These and other objects and advantages of the embodiment herein will become readily apparent from the following detailed description taken in conjunction with the accompanying drawings.

BRIEF DESCRIPTION OF THE DRAWINGS

The other objects, features and advantages will occur to those skilled in the art from the following description of the preferred embodiment and the accompanying drawings in which.

Figure 1:
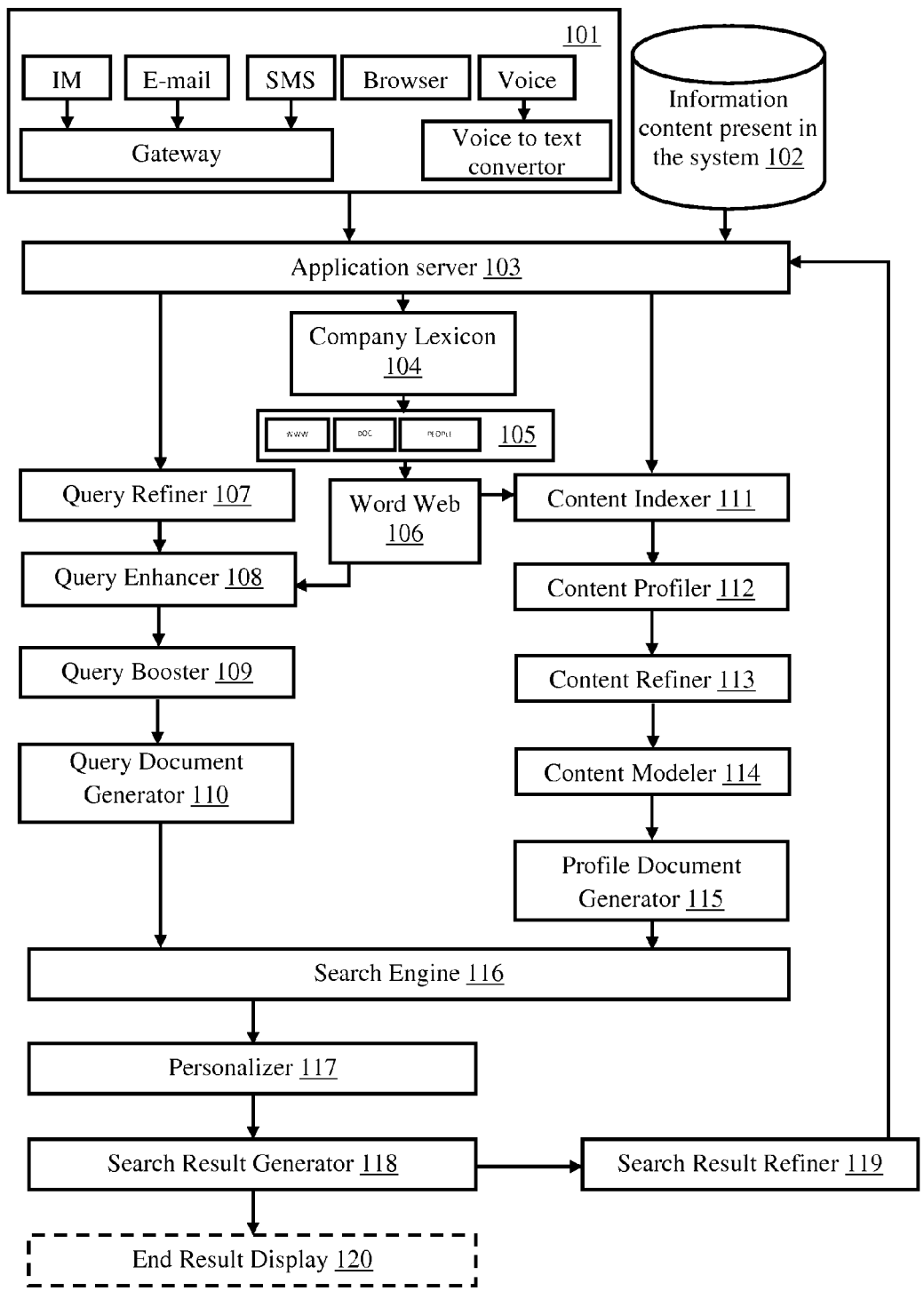
FIG. 1 illustrates a functional block diagram of a system architecture explaining the components of the search engine to locate relevant data in a communication network according to one embodiment herein.

Although specific features of the embodiments herein are shown in some drawings and not in others. This is done for convenience only as each feature may be combined with any or all of the other features in accordance with the embodiments herein.

DETAILED DESCRIPTION OF THE DRAWINGS

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system and method to personalize information retrieval in a communication network. The method comprising receiving one or more inputs from a plurality of sources, processing information present in the one or more inputs received from the plurality of sources, performing a contextual and personalized search based on the inputs received and displaying one or more results in support of the information in the communication network.

The plurality of sources comprises an instant messenger, an electronic mail, a short message service, a browser, a voice command and an incumbent information source. 'One or more' inputs comprises at least one of a user interaction and prevalent information content. In the enterprise, the prevalent information includes various databases such as wikis, emails, chat, document repositories or any other text-based data sources. Eventually, the search engine will include non-text data sources as well as textual data sources. The process of receiving one or more inputs from a plurality of sources comprises establishing a customized connection to the communication network and extracting information present in the plurality of sources. The process of establishing the customized connection to a communication network comprising at least one of connecting to an authenticated network and enabling privileged access to information in the communication network and developing suitable interfaces for efficient extraction and search of information in the network.

The system is provided with a search engine and a bot which is a software agent which is adapted to scan the interconnected networks and extract information. The system constantly indexes and profiles people and documents based on the content in the network as well as interactions with the system. The system further creates an intelligent web of words to form the network dictionary, also called the Word-Web and analyzes vast amounts of structured and unstructured content to help users locate the most real time, trusted, personalized and contextually relevant information in the network.

The bot (software agent) crawls through the existing systems to learn about the terrain of the network, which is the jargon used by its people. The bot retrieves as much data/words as possible based on the amount of systems it is allowed to access in the network. The more systems it has access to, the better the software understands the network. A graph of associated words and people—the network dictionary is created, which forms the basis of the intelligent search. The network dictionary is built through dictionaries, websites which are domain specific, through documents available in the network, through experts and also through interactions the users have with the system. Further the strength of associations between words is gauged based on the source and statistical modeling of the data obtained from the sources. The search and retrieval processes is continued as new words are introduced to the network for instance, through a new registered user in the network, a new employee who has worked on a technology unknown to the company or a new business line the company is entering or even a customer the company has acquired—the bot laps up new words and fits them appropriately in the network dictionary. The bot then maps the information assets in the network—its people and documents (whitepapers, proposals, pricing documents, presentations, purchase orders and invoices, resumes, audio or video clippings, mails, etc)—and learns the words associated with each. This mapping is done periodically and from every new interaction of an information asset, the associated words are updated.

User and collateral profiles are built based on the content and interactions in the system. The search engine creates user profiles that mimic real-life identities of the person as much as possible with the data available. This requires validating data across multiple sources and ensuring that abundance or scarcity of data does not over-influence the profile. Further the search engine updates these profiles continually based on user behavior detected in the environment (not limited to interactions with the search engine) For instance, A users profile is populated based on the conversations he shares with his contacts, the questions he has asked within the system, the relationships he shares with people, databases that contain records of the user, collaterals generated by the user, etc. Similarly a collaterals profile is populated based on the contents, metadata, the people it has circulated amongst, etc. Each user profile consists of the following: a user-specific version of the Word-Web in which the user perspective of relationships between words is captured, the relative strength of the user association with words at that instant in time and his relationship with other information assets such as people and documents in the environment. The relative strengths are calculated based on factors such as authenticity of data sources, time, frequency of occurrence, duration of word associations, the relationship of other people associated, etc. The engine calibrates these weights periodically to ensure that the profiles are close to reality. Formulaically, User profile Ui can be represented as (Ui)=summation across all words {source of word x authenticity of source of word x time function of word decay x strength of word in each source}+ Metadata {name, age, current location, other locations, gender, other users linked to, nature of relationship with linked users, associated artifacts (such as blogs, documents . . . ), type of phone used, type of browser used etc. . . . }. Authenticity of source of word is an arbitrarily defined number to start with that gets progressively defined & refined through user interactions and machine learned by the engine.

When a query is posted on the main server, the system understands the context of the query by performing natural language processing of the input query, by processing user's profile, analyzing history of similar queries in the network and enhancing the query by considering associated words obtained from the built network dictionary. In addition to this, the system builds a social graph which is a web that defines the nature of interconnections between people in the network. For example, in a social network, the social graph contain details such as the degree of separation between people, the relationships they share such as friend, family, social acquaintance, customer, etc, the quality of the relationship between people gauged by measures such as the number of interactions, the number of common connections, etc. Similarly, in an enterprise network, the social graph will contain details including employee hierarchy, designation, etc. Based on the degree of match between the query document, the user and collateral profiles, the strength of interest of the users on the chosen keywords, relevance feedback based on the system's usage by people, the social graph of the network, the system then determines the relevant and personalized search results that matches the user's query.

The search engine constantly learns about the terrain of the network and its information assets and enables contextual matching so that the appropriate person, artifacts, archives, advertisements or derived information is provided to answer a query. The search engine further can be accessed through the desktop client, company intranet, web browser, Instant Messenger, SMS and cell phone client. The search engine described according to the embodiments herein is easy to deploy and can add on to existing systems in a network.

The search engine uses a combination of statistical/mathematical models as well as semantics to analyze data. At the heart of the search engines data analysis lies the 'Word-Web', which is an ever-growing corpus of words (across languages) connected to each other in a non-hierarchical manner. The Word-Web creates associations of words based on statistical analysis and semantic understanding. For instance: the search engine will use statistical models to understand that 'Napoleon' and 'Bonaparte' are somehow related because they appear frequently together. The search engine will further use semantics to understand that 'Napoleon Bonaparte' was French. These associations are re-modeled continuously to reflect the search engines increasing understanding of the environment.

The Word-Web is built ground up for every environment that search engine operates in. For instance, for each company where the enterprise solution is deployed, the Word-Web is primarily built from data sources in the enterprise. It is then augmented by Word-Webs from other deployments as well as semantic understanding of words from public sources like Wikipedia. Over time, the Word-Web, which is the summation of all bespoke Word-Web deployments will be a semantic dictionary that understands words across languages and create meaningful associations between the words. In each enterprise, the specific Word-Web is continuously tuned by learning's from user-interactions. This allows continuous capture of tacit and 'localised' knowledge within the enterprise. Actions such as user-suggestions/user-corrections help the enterprise-specific Word-Web to create user-specific versions of itself. For instance, a user may teach the search engines Word-Web that Napoleon Bonaparte is the name of a brand of cheese. Thus, the association of words is considered high for that particular user and not as high priority for other users.

Further, the search engine does not necessarily require Semantic Web ready data. By absorbing discrete data and creating loose associations between the absorbed data (which evolve with time), the search engine circumvents the need for W3C standard prescribed semantic models. The loose association between data is imposed on natural structures in the environment (such as organization structure in a company or nature of relationship between members in a social network). By adapting natural structures in its environment of operation and not depending entirely on the grammar of the text, the engine provides for eliminating the need to completely follow W3C standards for semantic understanding and deriving the context from the environment of operation, thereby locating the most relevant information source. However, the search engine stores information such that it can easily adapt to W3C standard semantic capabilities.

The search engine is architected in such a way that the accuracy of the information model does not diminish with time. Machine learning algorithms in the search engine constantly evaluate effectiveness of relationships between words, people and documents. For instance, if the only instance of a person's involvement in 'nanotechnology' was detected 5 years ago, the search engine machine learning algorithms capture the decay of the association over time unless another instance on the same topic was detected later. This is coupled with learning from user-interactions, thus ensuring the scalability and sanctity of the search engines information model over time.

As an open platform, the search engine is amenable for other use cases which require different analysis to be done on the data. For instance, CEOs can use the search engine to analyse areas of work flow inefficiencies in the companies. Since search engine does not know how to measure this, it has to be taught. The user (in this case the CEO) can program the search engine to consider 5 data points and process them in a specific formula. If the data points are available, the search engine can do the necessary analysis and render the required results. The open approach frees users from being tied down to the prescribed formulae of packaged software and allows them to define their own perspectives for insight creation.

FIG. 1 illustrates a functional block diagram of a system architecture explaining the components of the search engine to locate relevant data in a communication network according to one embodiment herein. The system comprising an application server 103 with at least one input source. The at least one input source includes user interaction content 101 such as an instant messenger, electronic mail, short message service, internet browser, voice messenger and the like. The instant messenger, electronic mail and short message service are connected through a communication gateway to the application server 103. In case of a voice input, the voice is passed through a voice to text converter component and further the converted text is inputted to the application server 103. The input further includes information content 102 prevalent in the system and the system interactions by the user.

The personalized information retrieval system further consists of a query refiner 107 which refines the input information provided from the application server 103. The output of the query refiner 107 is then transmitted to a query enhancer 108 where the query is enhanced with words from modules such as the data modeler. The data modeler provides words based on statistical modeling of the query and the Word-Web 106 or network dictionary which provides synonyms, hypernyms, and user associated words with varying degrees of correlation.

The output of the query enhancer 108 is transmitted to a query booster 109 which includes an analyzer chain which associates different boosting factors and weightages to different modules based on inputs from the previous stages and transmitted to query document generator 110. The query document generator 110 further generates query document pertaining to users query.

According to another embodiment, the output of the application server 103 is transmitted to the content indexer 111 which collects information content present in the system. The output of the content indexer 111 is further transmitted to content profiler 112 where the association of content to people and collaterals are built.

The content refiner 113 further refines users and collateral profiles by passing the information through a plurality of modules. The modules include at least one of a noise filter, histogram filter, semantic indexing and stemming filter. The output of the content refiner 113 is transmitted to content modeler 114 where each user and collateral is assigned a weightage.

The content modeler 114 receives the input from the content refiner 113 which consists of a profile weighing component. The profile weighing component is used to assign weightages to words in a person's profile based on different factors like the source of data, the frequency of occurrence of words in the person's profile, the relative occurrence of the words when compared to those in his network, frequency of updation of certain words, etc. The content modeler 114 further output's data which is used by the profile document generator 115 to generate a profile document.

Further the profile document generator 115 consists of profile document component which generates profile document for internal use in the search engine 116. The profile document includes all the words of the user or artifact i.e. each user and each document will have at least one profile of which will contain the words associated with the user/profile.

The generated query document and profile document is fed into the search engine component which comprises of a dynamic weight assigner component, an iterative component and a statistical refiner. All these components assist in performing the search based on user criteria.

The result of search engine 116 is further fed into a personalizer 117 which contain personalizer module component which modifies the search results based on user inputs. The search result generator 118 further generates the search result and is using the search output component and the output is fed to the result refiner 119. The result refiner 119 further questions the user whether to refine the search result further. If yes, the search result is further fed to search result refiner 119 with the user search criteria. The search result refiner 119 consists of dynamic filter which allow the user to refine the query. The filter is dynamic because the filter options are based on the query and the results generated. Tag cloud is one way of representing the dynamic filter. The outcome of the search result refiner 119 is fed into application server 103 which carries the entire searching process according to the user inputs.

Figure 2:
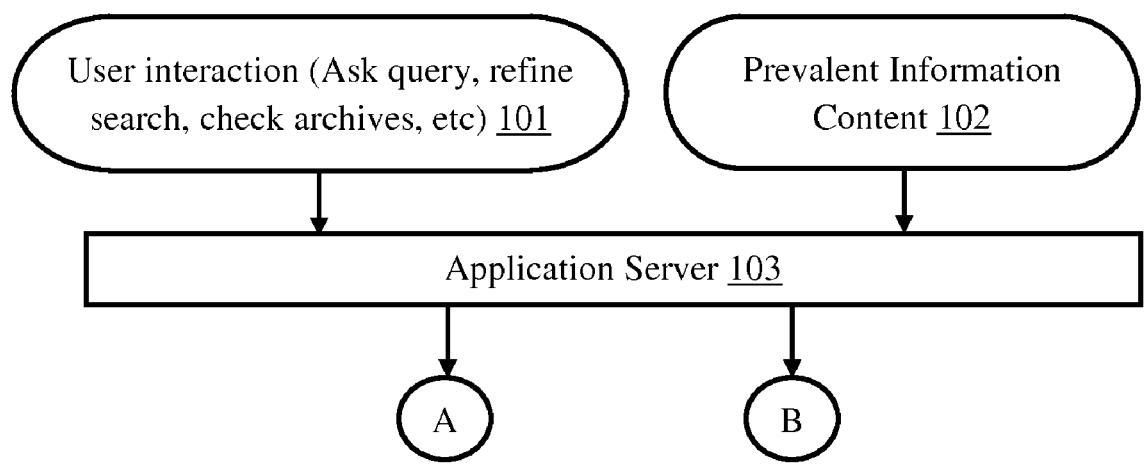
FIG. 2 illustrates a block diagram of the search engine at an initial stage where the information is passed onto the search engine according to one embodiment herein.

FIG. 2 illustrates a block diagram of the search engine at an initial stage where the information is passed onto the search engine according to one embodiment herein. With respect to FIG. 2, the input to the search engine 116 is information provided as user interaction 101 such as asking a query, refine search request and checking for archives. Asking a query involves users posting query to the search engine 116 further where the search engine 116 uses the intelligence for posting the query to relevant users. Refining search involves refining the search query which has been received from the search result refiner component. Checking archives includes users posting a query to check whether the posted query has an answer in the archive section. Another important source of data includes prevalent information content which is the pre-existing and constantly accumulating information in the network. This includes information present in databases, blogs, wikis, archived communication between members, etc.

Figure 3:
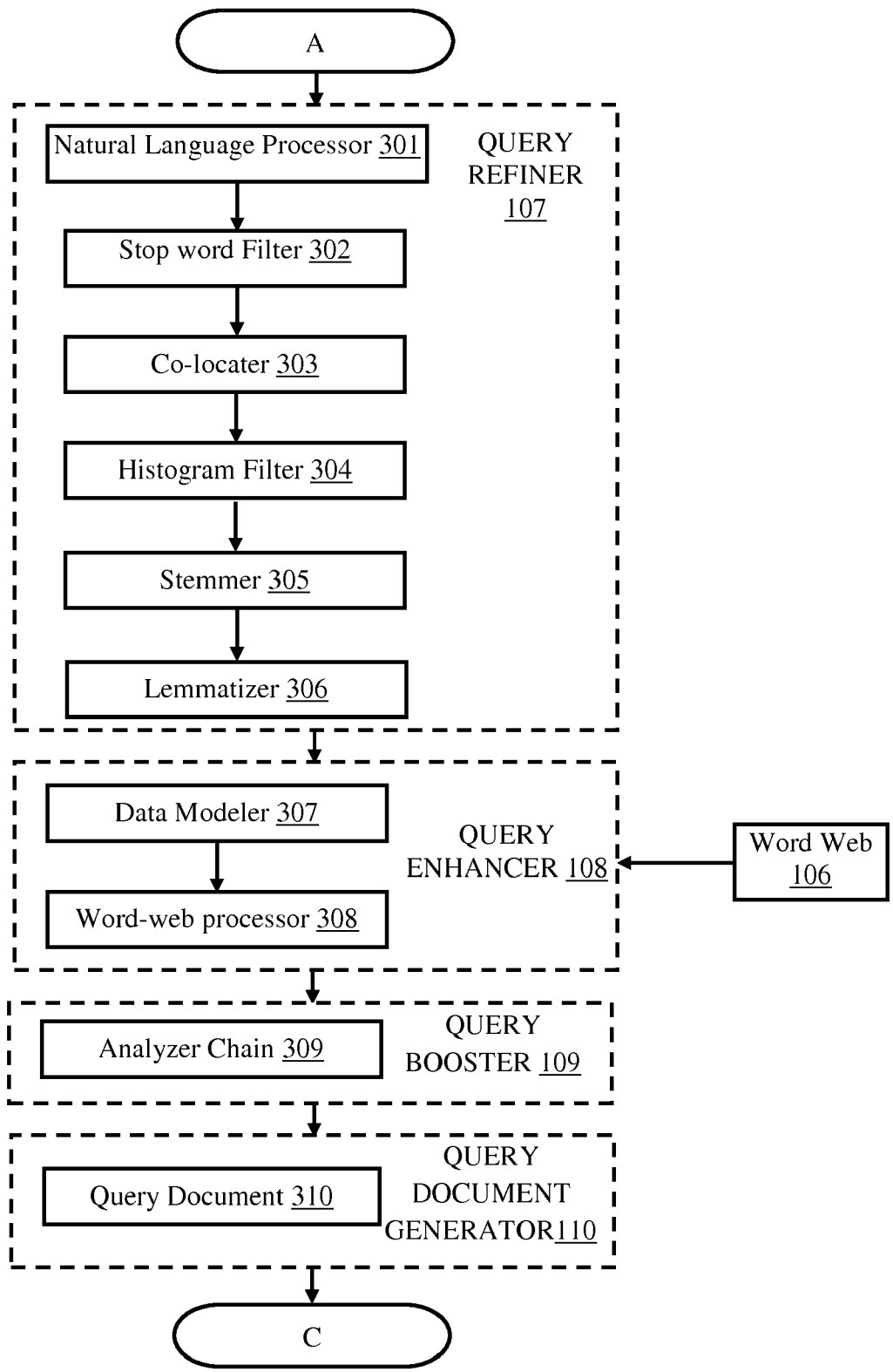
FIG. 3 illustrates a functional block diagram of a search engine indicating the query processor, query enhancer, query booster and query document generator components according to one embodiment herein.

FIG. 3 illustrates a component architecture diagram of the method for personalizing information in a communication network according to one embodiment of the present disclosure. FIG. 3 illustrates a functional block diagram of a search engine indicating the query refiner 107, query enhancer 108, query booster 109 and query document generator 110 components according to one embodiment herein. With respect to FIG. 3, the information which is received as input from the user is fed into to the query refiner 107. The query refiner 107 comprises a natural language processor 301, a stop word filter 302, a co-locater 303, a histogram filter 304, a stemmer 305 and a lemmatizer 306. A natural language processor 301 is used to understand sentences like humans do. The natural language processor's 301 job is to understand the structure of a sentence. So given a sentence, at the minimum, the natural language processor figure out the parts of speech in the sentence. The natural language processor 301 also figures out that when there are words like 'when', 'where', 'how' etc, the sentence is a question. Similarly if the sentence contains a location or time or date, etc, the natural language processor 301 will be able to figure that out. For instance: in the sentence "Will TGIF in Bangalore be open at 11 PM?", the natural language processor 301 should be able to understand that the location is "Bangalore", time is "11 PM" and that this is a question because of the word 'will'.

The stop word filter 302 is used to remove stop words. Stop words 302 are those words that are extremely common and may not add significant value during search. For instance the words 'the', 'and', 'a', 'in', etc. A co-locater 303 is used to identify co-located words i.e. those words that make specific sense when they appear together. For instance ice cream, table tennis, ping pong, etc. The histogram filter 304 is used to remove noise based on the frequency distribution of words. For instance, if the word Microsoft is to be found in everyone's profile, searching for the word Microsoft amongst the profiles will not yield a significant result since the frequency of occurrence of the word Microsoft is very high. Hence in this case the word Microsoft is considered as noise. A stemmer 305 is used to stem (cut) words i.e. reduce words to identify base or root words. For instance, a stemmer 305 would be able to identify that walk, walked, walks, walking are all variations of the same word walk. A lemmatizer 306 is used to identify the base forms of the word. The lemmatizer 106 identifies the parts of speech of the word and then follows normalization rules to arrive at the base word. For instance, a lemmatizer 106 is able to figure out that the words 'sung', 'sang', 'singing', 'song', etc have the same base word song. Similarly the lemmatizer 106 realizes that the base form of the word better is good. A stemmer 305 will not be able to do this. Both a stemmer 305 and lemmatizer 306 will figure out that the base form of walking is walk.

The output of query refiner is fed into query enhancer 106 where the query enhancer 106 comprises a data modeler 307 and a word-web processor 308. The job of a data modeler 307 is to perform statistical modeling of data and gain intelligence. The data modeler 307 models data to figure out aspects like associations between words, the strength of association and more depending on the statistical derivations which are required. Currently the data modeler 307 provides for finding associations between words and the strength of association of words. Also, in future the data modeler 307 can be used to figure out different relationships between words. For instance, if "bullet" and "road" appear, it means that the sentence refers to "bullet" as a bike. The Word-Web processor 308 is used to process words and derive the Word-Web. The word-web processor 308 unit builds intelligence to the closest of words which are accumulated i.e. the word-web processor build associations (synonyms, hypernyms, hyponyms, abbreviations, etc) to words either by using public dictionaries like wordnet, domain specific websites and documents, public websites like Wikipedia and others and also through people teaching the system.

The outcome of query enhancer 108 is fed into the query booster 109 component. The query booster 109 components include an analyzer chain 309. The analyzer chain 309 is used to analyze the string of words that come in as an input to the analyzer chain 309 component. The analyzer chain 309 components assign different weightages to words based on the Word-Web 106 and data modeler 307. For instance, how strong or weak is the association of an additional word to the context of the sentence is provided by the analyzer chain 309. These weights are considered by the search engine 116 while arriving at the most appropriate results. The outcome of analyzer chain 309 is fed as input to the query document generator 110 component. The query document generator 110 component consists of query document 310 component which is the document that will have all the words concerned with the query that is used for the search.

Figure 4:
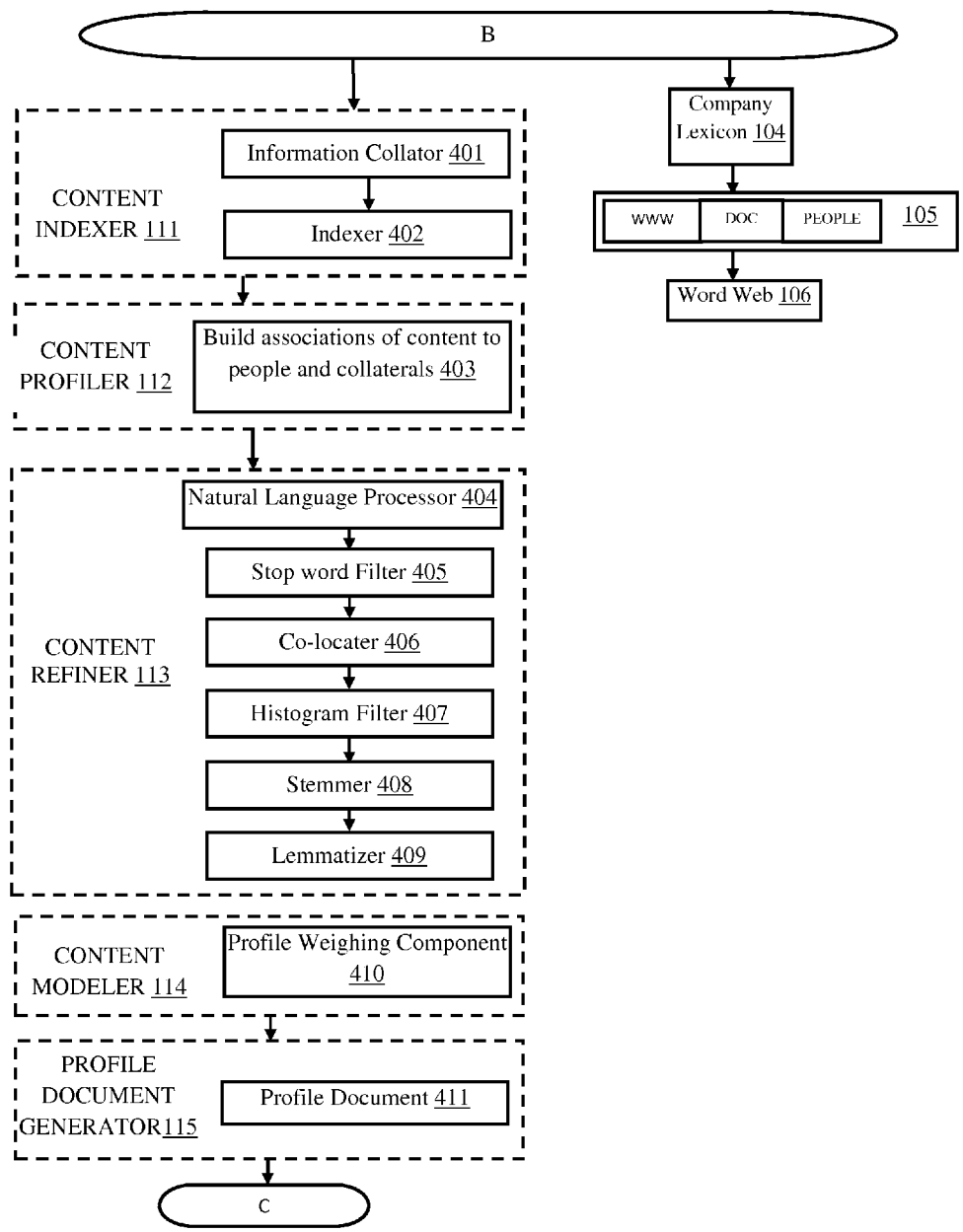
FIG. 4 illustrates a functional block diagram of a search engine indicating the content indexer, content profiler, content refiner, content modeler and content document generator according one embodiment herein.

FIG. 4 illustrates a functional block diagram of a search engine indicating the content indexer 111, content profiler 112, content refiner 113, content modeler 114 and content document generator 115 according one embodiment herein. With respect to FIG. 4, the input provided by the user is also fed to a content indexer 111 through the application server 103. The content indexer 111 comprises of an information collator 401 and indexer 402. The information collator module 401 is in charge of accumulating the words from data sources. The information collator 401 also contains some intelligence to decide when to send certain data for indexing. For instance, the index of user's profile with feedback is updated only after the feedback from other individuals is received a specific number of times. The indexer 402 is used to index the corpus which is the collection of data. The indexer 402 parses and stores the data for quick retrieval. Some indexers 402 like in the present embodiment can be intelligent in terms of treating the data i.e. by also doing a basic cleaning and sorting based on the data source before it goes to a refiner. The purpose of an indexer 402 is to optimize speed and performance in finding relevant documents for a search query. The company lexicon 104 components also take the input from the application server 103 which is the user interaction and prevalent information content. The company lexicon 104 is the lexicon created by the company or the enterprise. The company lexicon 104 contains all the words relevant to the company and hence is domain specific. The company lexicon 104 is fed into the Word-Web 106 to build some intelligence which is further fed to the content indexer 111. The Word-Web 106 which is an ever-growing corpus of words (across languages) connected to each other in a non-hierarchical manner. The Word-Web 106 further creates associations of words based on statistical analysis and semantic understanding of words. The associations between the words are re-modeled continuously to reflect the search engines increasing understanding of the environment.

The output of content indexer 111 is fed into content profiler 112 which builds association of content to people and collaterals. Further the output of content profiler 112 is fed into content refiner 113 as an input. The content refiner 113 comprises of a natural language processor 404, a stop word filter 405, a co-locater 406, a histogram filter 407, a stemmer 408 and a lemmatizer 409. The natural language processor 404 is adapted to understand sentences like humans do. The natural language processor 404 understands the structure of a sentence. So given a sentence, at the minimum, the natural language processor 404 figure out the parts of speech in the sentence. The natural language processor 404 also figures out that when there are words like 'when', 'where', 'how' etc, the sentence is a question. Similarly if the sentence contains a location or time or date, etc, the natural language processor able to figure that out. For instance: in the sentence "Will TGIF in Bangalore be open at 11 PM?", the natural language processor 404 should be able to understand that the location is "Bangalore", time is "11 PM" and that this is a question because of the word 'will'.

The stop word filter 405 is used to remove stop words. Stop words are those words that are extremely common and may not add significant value during search. For instance the words 'the', 'and', 'a', 'in', etc. A co-locater 406 is used to identify co-located words i.e. those words that make specific sense when they appear together. For instance ice cream, table tennis, ping pong, etc. The histogram filter 407 is used to remove noise based on the frequency distribution of words. For instance, if the word Microsoft was to be found in everyone's profile, searching for the word Microsoft amongst the profiles will not yield anything significant since the frequency of occurrence of the word Microsoft is very high. Hence in this case word Microsoft can be considered as noise. A stemmer 408 is used to stem (cut) words i.e. reduce words to identify base or root words. For instance, a stemmer 408 would be able to identify that walk, walked, walks, walking are all variations of the same word walk. A lemmatizer 409 is used to identify the base forms of the word by identifying the parts of speech of the word and then following certain normalization rules to arrive at the base word. For instance, a lemmatizer 409 will be able to figure out that the words 'sung', 'sang', 'singing', 'song', etc have the same base word song. Similarly it will realize that the base form of the word better is good. A stemmer 408 will not be able to do this. Both a stemmer 408 and lemmatizer 409 will figure out that the base form of 'walking' is 'walk'.

Figure 5:
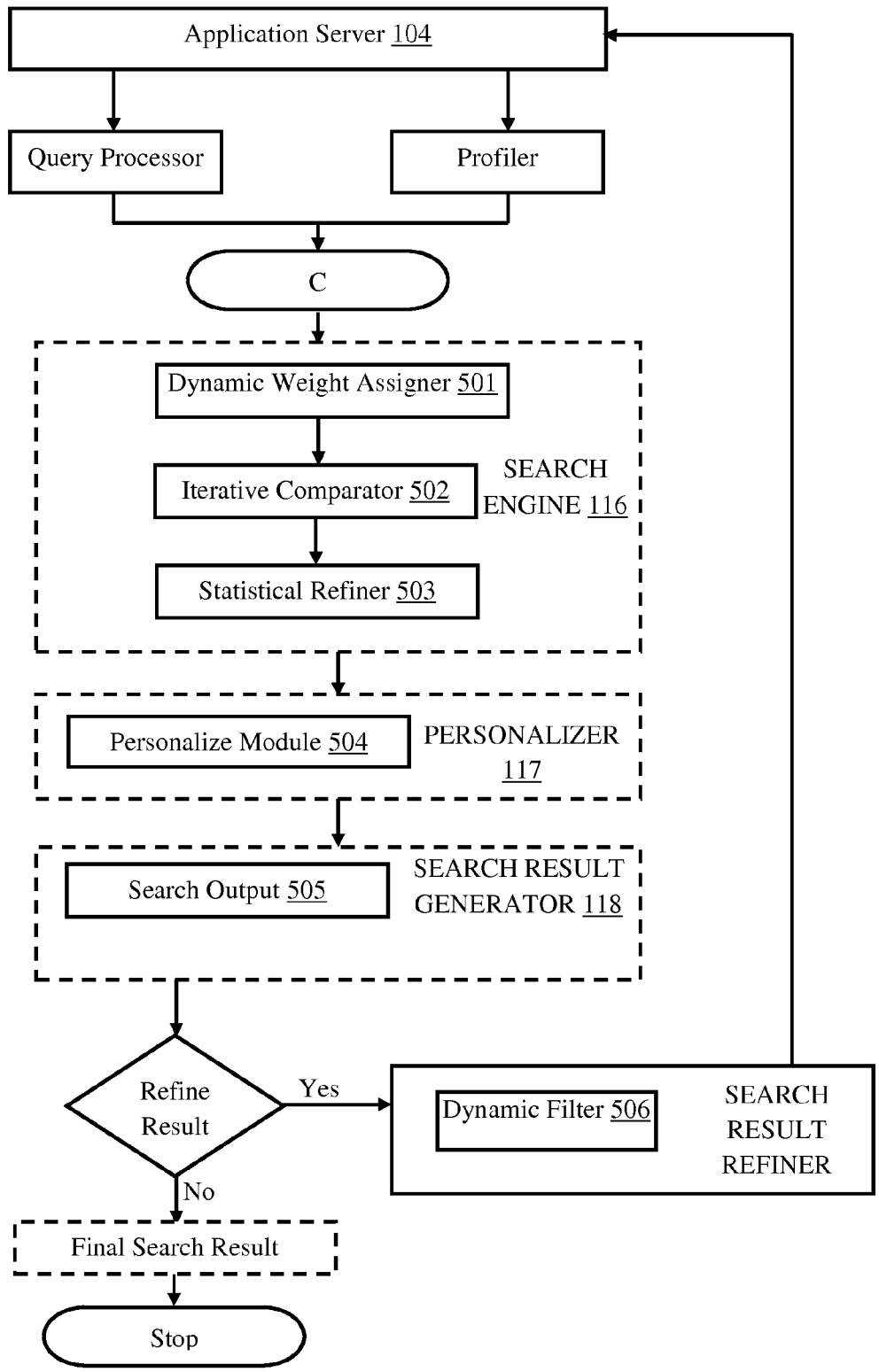
FIG. 5 illustrates the functional block diagram of a search engine indicating the search engine, search personalizer, search result generator and search result refiner components according one embodiment herein.

FIG. 5 illustrates the functional block diagram of a search engine indicating the search engine, search personalizer, search result generator and search result refiner components according one embodiment herein. With respect to FIG. 5 the query processor and profiler generates a query document and a profile document. The query document is the document that will have all the words concerned with the query that will be used for search where as the profile document is a document that will have all the words of the user or artifact i.e. each user and each document will have at least one profile of it which will contain the words associated with it. These virtual documents are fed into search engine. The search engine 119 comprises of components including a dynamic weight assigner 501, iterative comparator 502 and a statistical refiner 503. The dynamic weight assigner 501 defines the relevance of the search results based on parameters like histogram occurrence of words in the query and profile documents, historic search results, user feedback, etc. The dynamic weight assigner dynamically and iteratively assigns weights to words.

The iterative comparator 502 compares the query document and profile document and checks for the closeness of the profile document to the query document. The iterative comparator 502 does the comparison iteratively because every time there is a change in the query document, which happens when the engine wants to refine the search results either voluntarily or as chosen by the user, the comparator 502 has to repeat the comparison. The statistical refiner 503 decides the number of results to be displayed to the user. The refiner then defines a cut-off beyond which the search results displayed are not relevant based on the statistics.

The output of the search engine 116 is fed to the personalizer 117 which comprises of personalizer module 504. The personalizer 117 ensures the results are specific to the user and will do so by comparing the results with the profile document of the user and by using the social graph. The inputs of this module can also go back to the search engine 116 to obtain refined results specific to the user. The same module is also responsible for sorting and displaying the results in accordance with the user and specific user settings if any. The output of the personalizer module 504 is fed to search result generator 118 which comprises of search output component. The search output 505 component generates the required output results as per the user's custom criteria. Further if the result has to be refined for the user, the displayed result is fed to search result refiner 119. The search result refiner 119 comprises of dynamic filter 506 which allows user to refine the result. The dynamic filter 506 is dynamic because the filter options would be based on the query and the results generated. Tag cloud is one way of representing the dynamic filter. Hence, if the result output has to be refined it is fed to search result refiner 119 which is further fed to application server 103 to repeat the search. If the refining of search is not required, then the final end result is displayed to the user.

FIG. 6 illustrates the flowchart of the search logic employed by the search engine according to the embodiment presented herein. With respect to FIG. 6A, the input to the application server 103 is user interaction or prevalent information content. The query, transaction or refined result is processed by passing it through modules such as a histogram filter, stemmer, lemmatizer, natural language processor parser, co-locater, etc to obtain a more refined query as depicted by the steps in FIG. 6B. The query is further enhanced with words from modules such as the data modeler which provides words based on statistical modeling of the query, the word-web which provides synonyms, hypernyms, user associated words, etc with varying degrees of correlation, etc.

Further, the analyzer chain associates different boosting factors or weightages to different modules based on inputs from the above stages and one or more query documents pertaining to the user's query are generated.

Figure 6A:
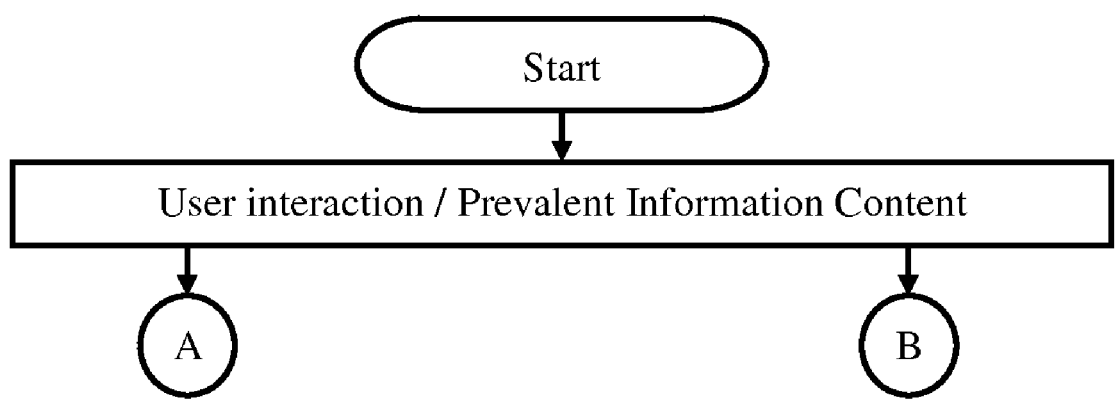
FIG. 6 illustrates the flowchart of the search logic using the search engine according to the embodiment presented herein.
Figure 6B:
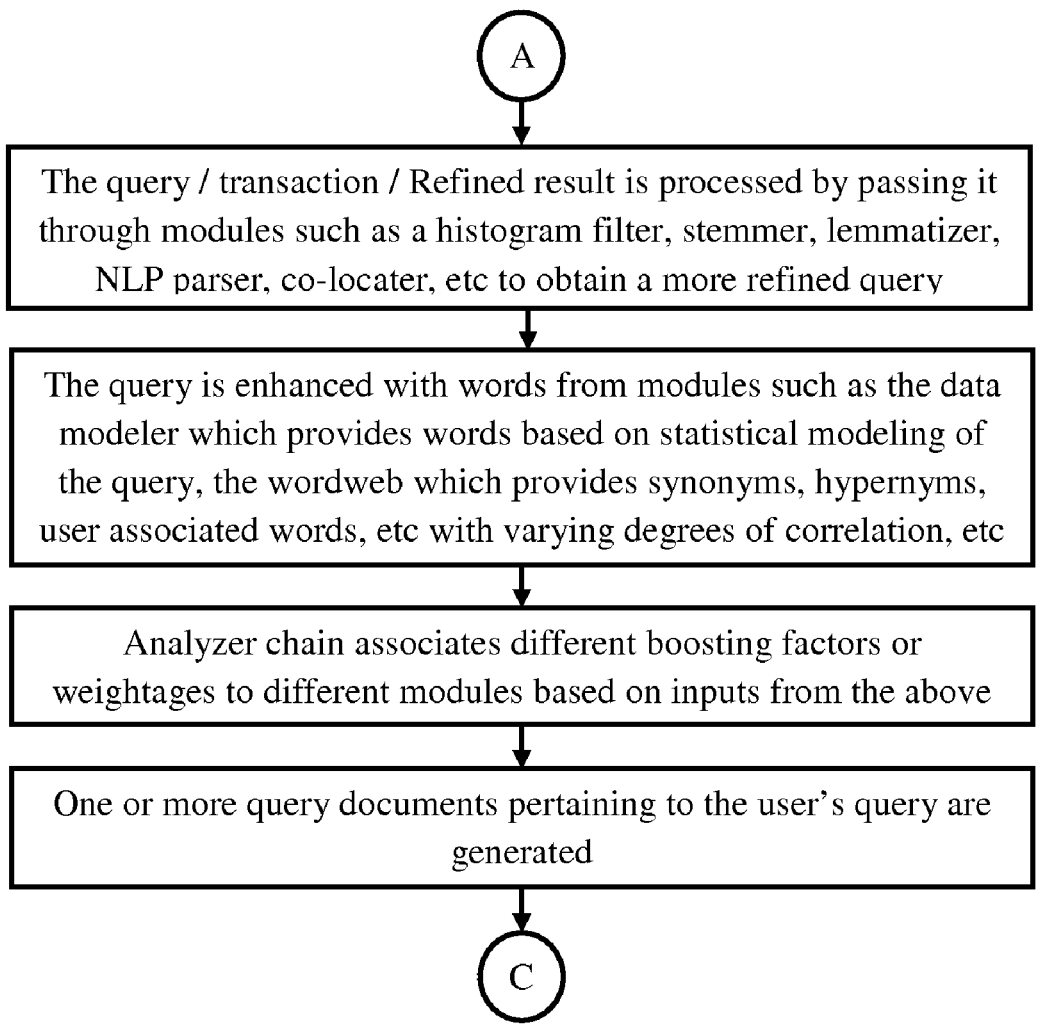
Figure 6C:
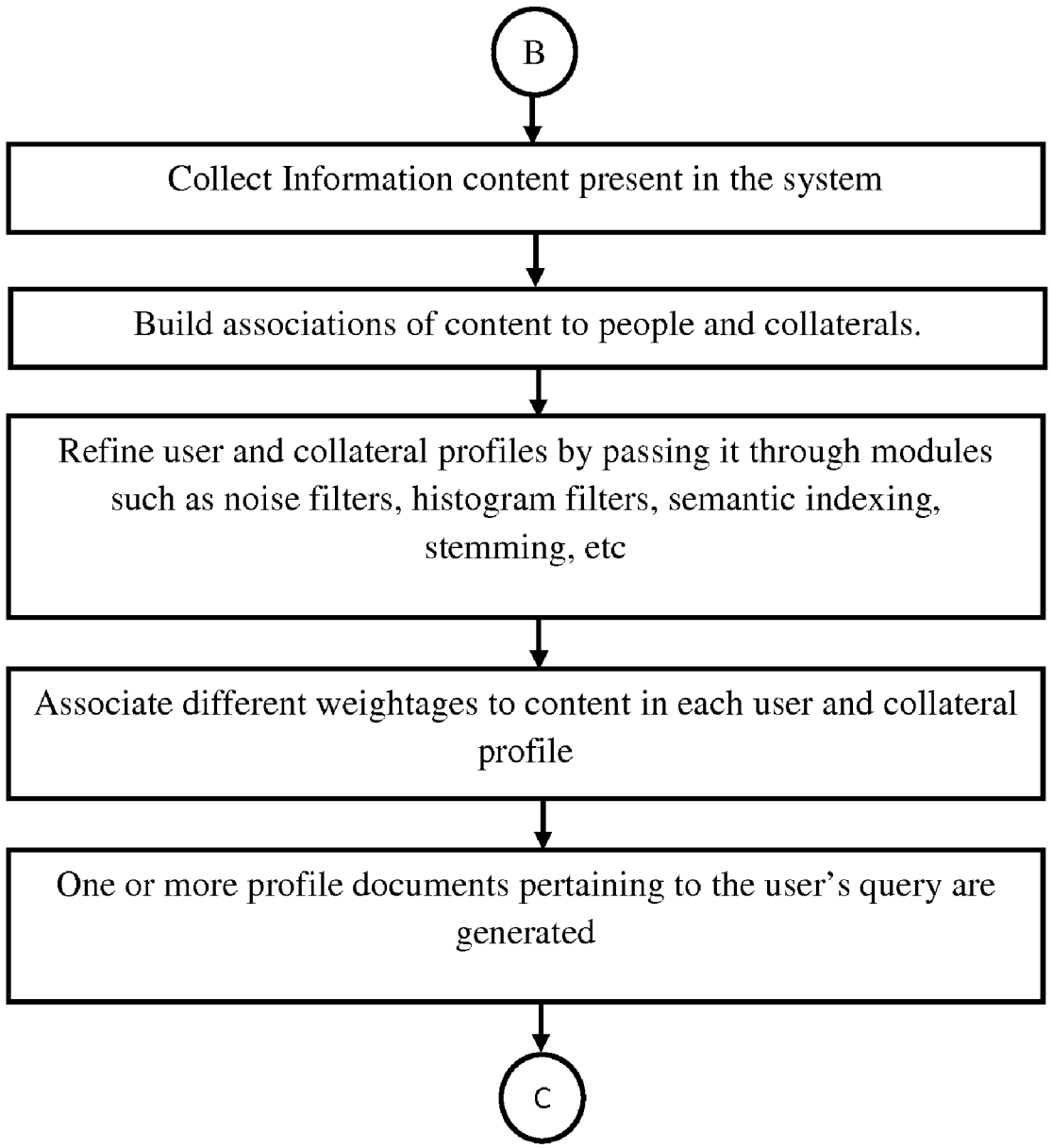
Figure 6D:
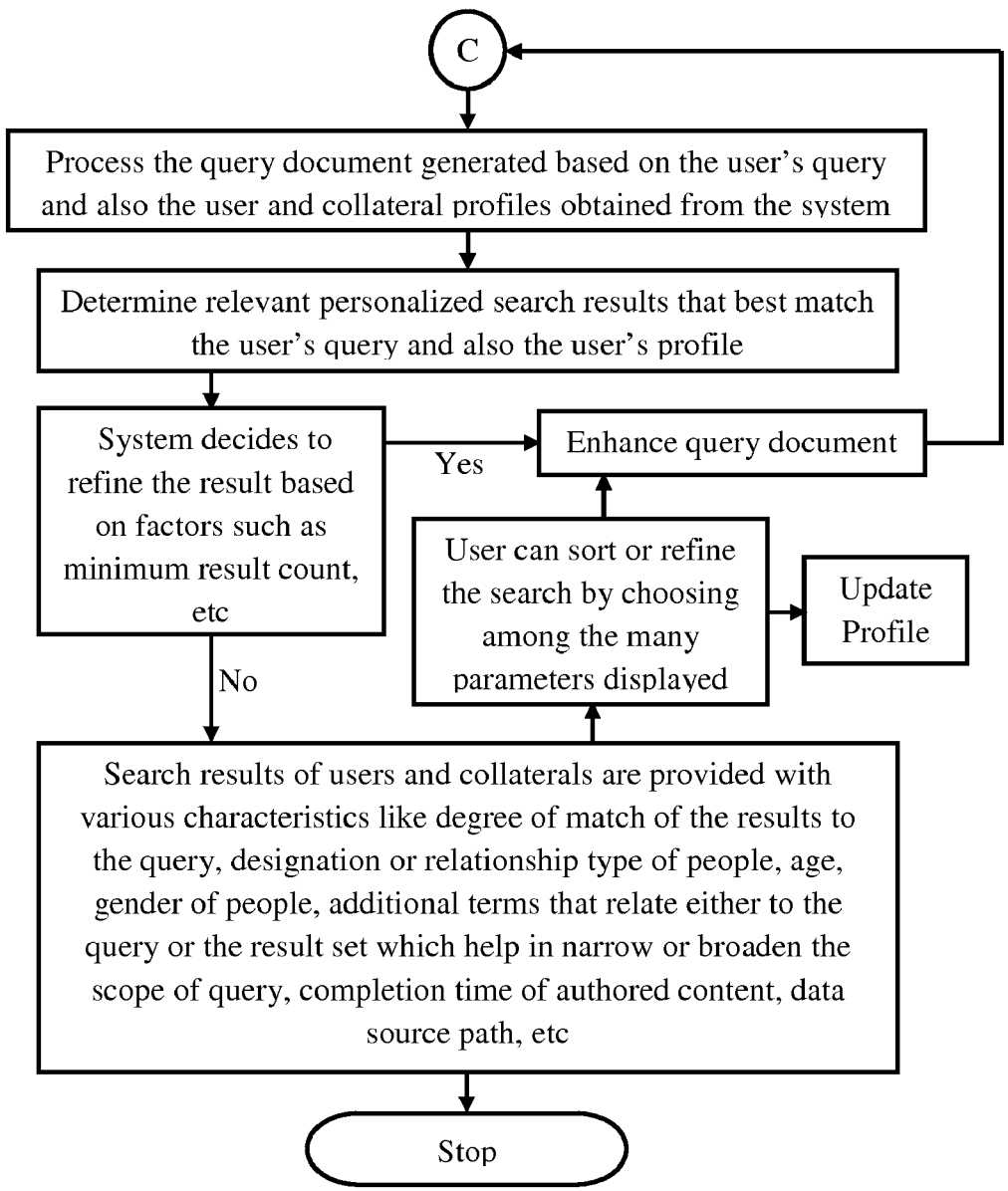

The input to the application server 103 is user interaction or prevalent information content is also fed to the profiler component as depicted in FIG. 6C. The profiler component collects information content present in the system, build associations of content to people and collaterals. The content refiner refines user and collateral profiles by passing it through modules such as noise filters, histogram filters, semantic indexing, stemming, etc. Further the content modeler associate different weightages to content in each user and collateral profile and one or more profile documents pertaining to the user's query are generated.

Further, the query document generated based on the user's query and also the user and collateral profiles is obtained from the system and relevant personalized search results are determined that best match the user's query and also the user's profile. If system decides to refine the result based on factors such as minimum result count, etc the query document is enhanced with various other search terms and fed to application server 103 to carry out a refined search. Search results of users and collaterals are provided with various characteristics like degree of match of the results to the query, designation or relationship type of people, age, gender of people, additional terms that relate either to the query or the result set which help to narrow or broaden the scope of query, completion time of authored content, data source path, etc. Further user can sort or refine the search by choosing among the many parameters displayed which further updates the user profile and enhances query document as described in FIG. 6D.

The embodiment described herein provides a system that helps harness the power of people to help users get their work done. Users can post a query and the system will identify the most contextually relevant, real time, personalized and actionable results to help the user. The system also presents the relevant artifacts, archives, advertisements and derived information regarding the query that the user has along with helping to locate the most relevant person in the entire network.

The embodiment herein also offers a system that automatically creates an intelligent web of words which helps maintain different representations of the same word while at the same time representing personalized adaptations for each user. This web of words helps for smooth information flow across colloquial and language boundaries.

The embodiment herein provides a search engine and software agent such that it is always on the watch for new information and automatically absorbs it. Also the embodiment herein provides a search engine and bot (software agent) which works in the background and routinely updates its databases without need for any manual intervention.

The embodiment herein provides a system that acts as a catch-all for structured and unstructured information in any network. The system constantly learns from interactions in the network and ensures that no information (explicit or tacit) is ever lost from the network.

Also by enabling the users to locate an information source quickly, the system significantly improves the information reuse in the network.

The system of the embodiment herein also allows users to ask their questions in conversational language. By interpreting the question and locating the relevant information source that can answer the question, the system makes information retrieval efficient and intuitive for users.

The embodiment herein offers a system that can be accessed via various media such as IM, email, internet browser, SMS and phone client. This ensures that users can locate information they want quickly and through the easiest medium at their disposal.

Although the invention is described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments herein and all the statements of the scope of the invention which as a matter of language might be said to fall there between.

What is claimed is:

1. A method for personalizing information retrieval in a communication network, the method comprising:
   receiving one or more inputs from a plurality of sources;
   processing an information present in the one or more inputs received from the plurality of sources, wherein processing the information comprises refining the information present in the one or more inputs of the plurality of sources, enhancing the information present in the one or more inputs of the plurality of sources, boosting the information present in the one or more inputs of the plurality of sources and extracting the information present in the one or more inputs to build people and artifact profiles;
   generating one or more virtual documents based on processed information present in the one or more inputs and wherein appropriate weights assigned to generate virtual profile documents for people and artifacts;
   performing a search based on the virtual documents generated and wherein performing a search comprises performing a contextual and personalized search based on the inputs received;
   generating an intelligent web of words from the one or more inputs of the plurality of sources;
   performing an iterative comparison between the information present in a query document with the information of the profile document;
   personalizing one or more results that to be displayed based on comparison of the results with the profile document of a user;
   refining a search result based on user inputs; and
   displaying one or more results in support of the information in the communication network.

2. The method according to claim 1, wherein the plurality of sources comprises an instant messenger, an electronic mail, a short message service, a browser, a customized client application, a voice command, and an incumbent information source.

3. The method according to claim 1, wherein the one or more inputs comprising at least one of a user interaction and a prevalent information content.

4. The method according to claim 1, wherein receiving one or more inputs from a plurality of sources comprises establishing a customized connection to the communication network and extracting information present in the plurality of sources.

5. The method according to claim 4, wherein establishing a customized connection to the communication network comprises at least one of establishing or connecting to an authenticated network and enabling privileged access to information in the communication network, and developing suitable interfaces for efficient extraction and search of information in the network.

6. The method according to claim 1, wherein processing the information further comprises synthesizing information present in the one or more inputs wherein synthesizing the information comprises building a social graph which is a web that defines the nature of interconnections between people in the network, creating profiles of people and artifacts in the communication network, and generating a virtual query document.

7. The method according to claim 6, wherein refining the information further comprises removing noise or unwanted information present in the one or more inputs of the plurality of sources through the use of a filters and wherein the filter includes a stop word filter and a histogram filter.

8. The method according to claim 6, wherein the enhancing the information comprises determining associations between words and determining a strength between associations of words.

9. The method according to claim 8, wherein determining association between words and the strength between associations of words is based on developing a web of words.

10. The method according to claim 9, wherein the web of words called Word-Web is built using statistical, mathematical and semantic data models.

11. The method according to claim 10, wherein developing the Word-Web uses at least one of a word net, one or more public websites, one or more domain specific websites, one or more predefined documents and user inputs.

12. The method according to claim 10, the Word Web is an ever growing corpus of words across various languages connected to each other in a non-hierarchical pattern.

13. The method according to claim 10, wherein the Word-Web circumvents the need for W3C prescribed semantic models.

14. The method according to claim 10, wherein the associations of words are remolded continuously to reflect the search engines increasing understanding of the environment.

15. The method according to claim 10, wherein the Word-Web is deployed over heterogeneous networks such as enterprise network, public networks and consumer groups.

16. The method according to claim 15, wherein a unified Word-Web which is an amalgamation of the Word-Web deployed over different networks developed to form a semantic dictionary adapted to understand words across languages and create meaningful associations between them.

17. The method according to claim 10, wherein a user-specific version of the Word-Web is developed and wherein the user-specific version of the World-Web captures a user's perspective of relationship between words.

18. The method according to claim 10, wherein the intelligent Word-Web is versatile and created for various levels of granularity to capture nuances at the user level and the network level.

19. The method according to claim 6, wherein profiles of people and artifacts in the network are represented as virtual profile documents.

20. The method according to claim 6, wherein each user's profile consists of a user specific version of the Word-Web, the relative strength of the user's association with the words and the user's relationship with information assets including people and artifacts in the network.

21. The method according to claim 6, wherein artifact profiles includes the content in the artifacts, its metadata and the people associated with in the communication network.

22. The method according to claim 6, wherein the personalized information retrieval search engine algorithms constantly evaluate effectiveness of relationships between words, people and documents so that the accuracy of the user profiles do not diminish with time.

23. The method according to claim 6, wherein a query document comprises at least one of the words relevant to the query post processing.

24. The method according to claim 23, wherein the processing of query involves refining, enhancing and boosting the query by performing natural language processing, by using a noise filters and by using the Word-Web and wherein the noise filter includes a stop word filter, a histogram filter, and an enhancer, and wherein the enhancer includes a co-locater, a stemmer and a lemmatizer, and wherein boosting of information is performed by assigning weights to words in the information of the one or more inputs based on different parameters and wherein the parameters includes at least one of source of information, the frequency of occurrence of words and the frequency of updation of words.

25. The method according to claim 1, wherein performing the search comprises performing an iterative comparison between the information present in query documents with the information of the profile documents and personalizing one or more results that are to be displayed based on the profile document of a user and the social graph of the network.

26. The method according to claim 1, further comprises displaying the results based on the inputs from the plurality of sources; and refining the one or more results displayed.

27. The method according to claim 26, wherein displaying the results comprises showcasing details of the relevant people, artifacts, archives, advertisements and derived information in the network.

28. The method according to claim 26, wherein displaying the results comprises providing an analysis on the data in the communication network based on the criteria defined by the user.

29. The method according to claim 26, wherein the result refining due to user or system inputs comprises modifying the information present in the query documents, updating user profiles based on the feedback from refining results and updating the intelligent Word-Web.

30. The method according to claim 26, wherein the result refining further comprises performing a search based on the updated query and profile documents and displaying a personalized and context relevant one or more results.

31. A system for personalizing information retrieval in a communication network, the system comprising:
an application server to receive one or more inputs from a plurality of sources;
a processor to process an information present in the one or more inputs received from the plurality of sources, to generate one or more virtual documents based on the processing of the information present in the one or more inputs and to perform a search based on the virtual documents generated; and
a display unit for displaying one or more results based on the document generated for the information;
wherein the processor comprises a Word-Web generator to generate an intelligent web of words from the one or more inputs of the plurality of sources, and wherein the processor comprises a content indexer and pro filer to extract information from the one or more inputs of the plurality of sources to build people and artifact profiles, and wherein the processor comprises a content refiner for refining the contents from the one or more inputs of the plurality of sources, and wherein the processor comprises a content modeler and profile document generator to assign appropriate weights to generate virtual profile documents for people and artifacts, and wherein the processor comprises a search engine for performing an iterative comparison between the information present in a query document with the information of the profile document, and wherein the processor comprises a personalize module for personalizing one or more results that are to be displayed based on comparison of the results with the profile document of a user, and wherein the processor comprises a search result refiner to refine search results based on user inputs.

32. A system according to claim 31, wherein the processor further comprises:
a query refiner for refining the information present in the one or more inputs;
a query enhancer for enhancing the information present in the one or more inputs of the plurality of sources;
a query booster for boosting the information present in the one or more inputs of the plurality of sources and the boosting of information is performed by assigning weights to words in the information of the one or more inputs based on different parameters and wherein the parameters includes at least one of source of information, the frequency of occurrence of words and the frequency of updation of words; and
a query document generator for generating a virtual document based on the processing of the information.

* * * * *